United States Patent [19]
Rinaldi

[11] Patent Number: 5,126,523
[45] Date of Patent: Jun. 30, 1992

[54] DEVICE FOR WELDING PIPES TO EACH OTHER

[75] Inventor: Fernando Rinaldi, Guardamiglio, Italy

[73] Assignee: Atlantic Point, Panama

[21] Appl. No.: 639,808

[22] Filed: Jan. 10, 1991

[30] Foreign Application Priority Data

Nov. 2, 1990 [NL] Netherlands .................. 90 02398

[51] Int. Cl.⁵ .................................................. B23K 9/12
[52] U.S. Cl. ............................ 219/60 R; 219/125.11
[58] Field of Search ............... 219/60 R, 60 A, 61, 219/125.11, 125.1

[56] References Cited

U.S. PATENT DOCUMENTS

| | | | |
|---|---|---|---|
| 3,380,148 | 4/1968 | Nelson et al. | 219/61 |
| 3,555,239 | 1/1971 | Kerth | 219/125.1 |
| 3,734,387 | 5/1973 | Sannipoli | 228/6 |
| 3,910,480 | 10/1975 | Thatcher | 219/60 A |
| 4,144,992 | 3/1979 | Omae et al. | 219/125.11 |
| 4,145,593 | 3/1979 | Merrick et al. | 219/125.11 |
| 4,373,125 | 2/1983 | Kazlauskas | 219/60 A |

FOREIGN PATENT DOCUMENTS 61-78596 4/1986 Japan.

*Primary Examiner*—Clifford C. Shaw
*Attorney, Agent, or Firm*—Osterlenk, Faber, Gerb & Soffen

[57] ABSTRACT

In a device for welding together pipe ends of pipes held mutually in line, a fixing band is first clamped around a pipe and a ring frame for opening and closing is then arranged therearound which is provided with a guide rail for guiding at least one welding carriage along the periphery of a ring weld.

15 Claims, 3 Drawing Sheets

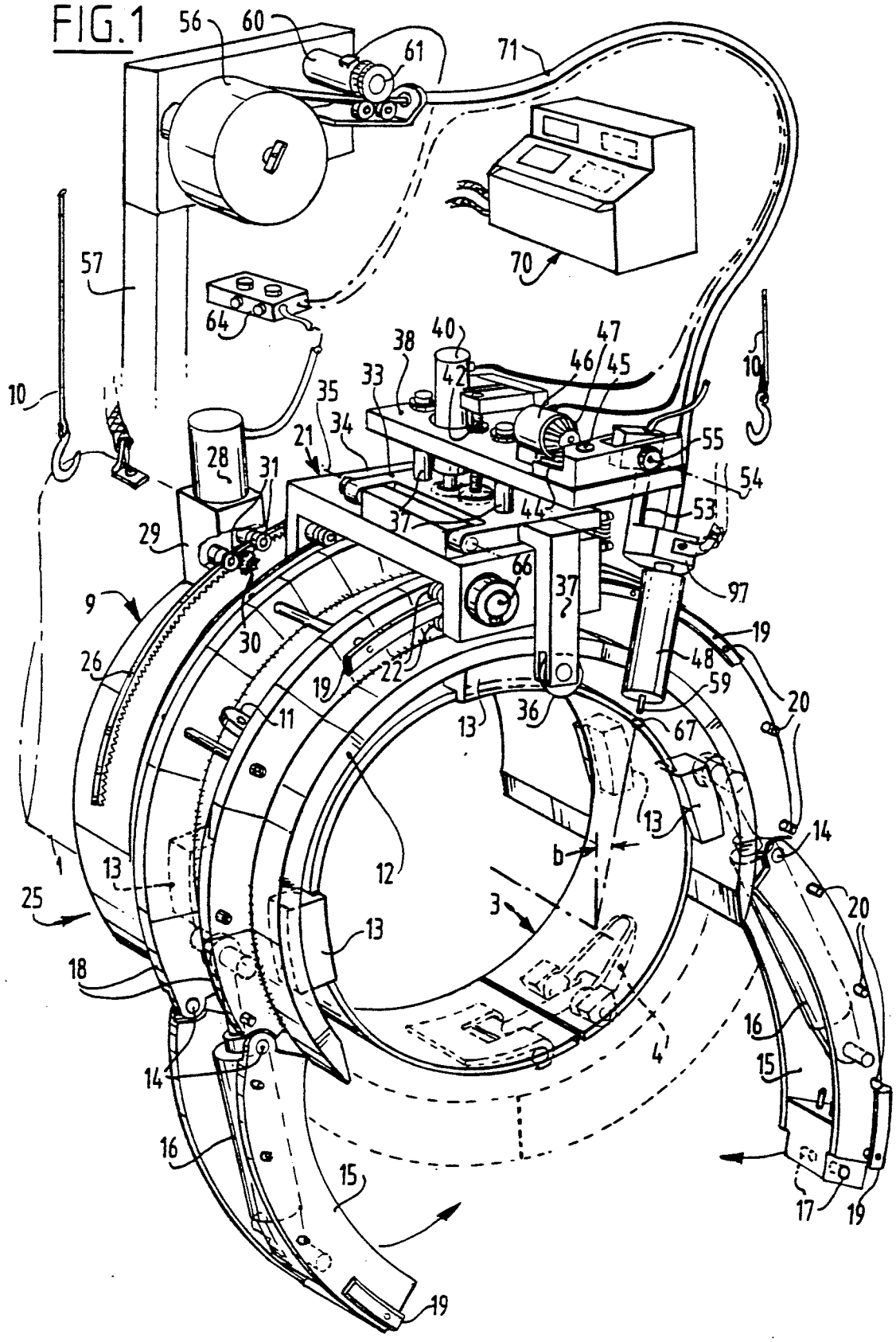

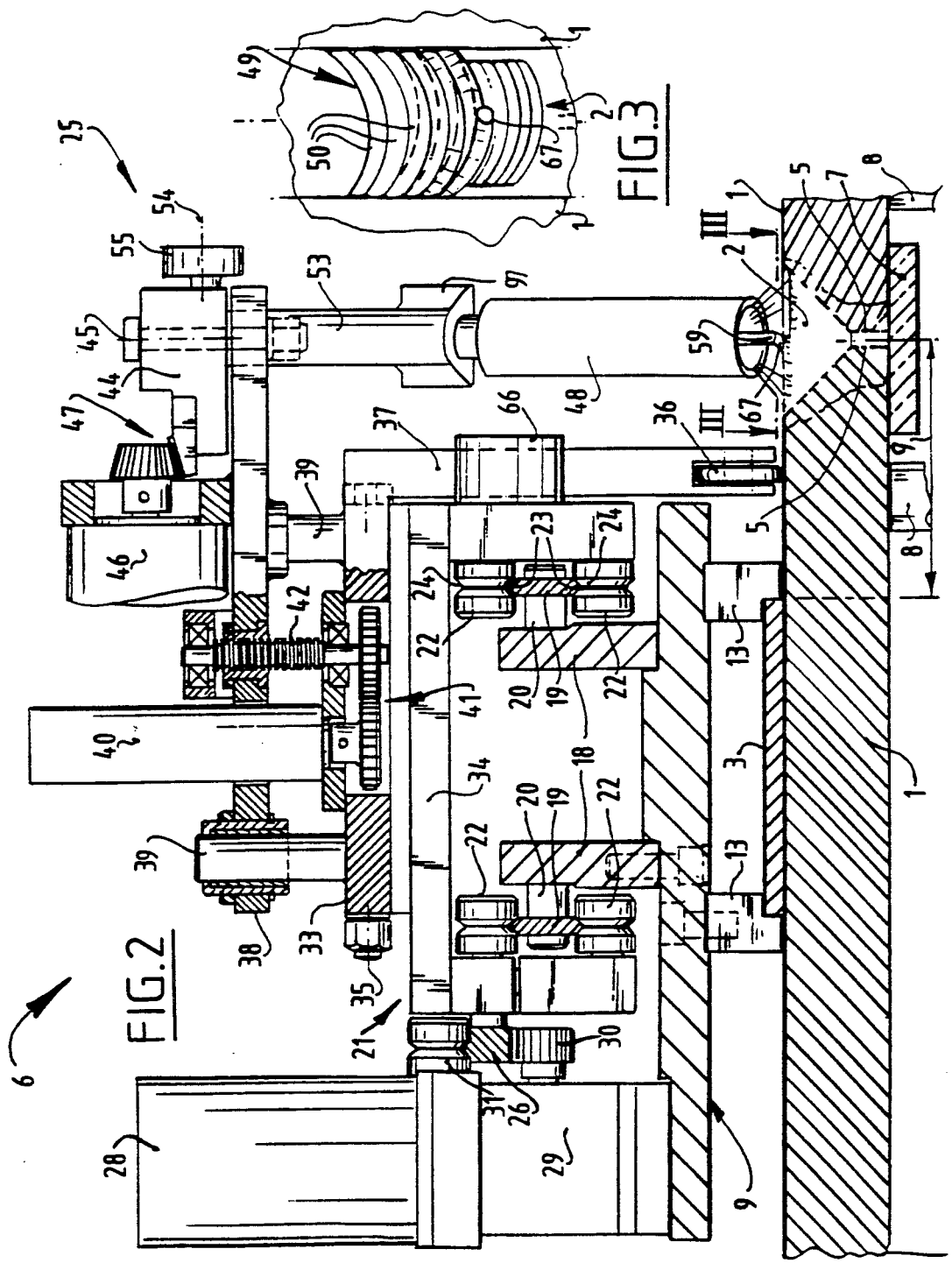

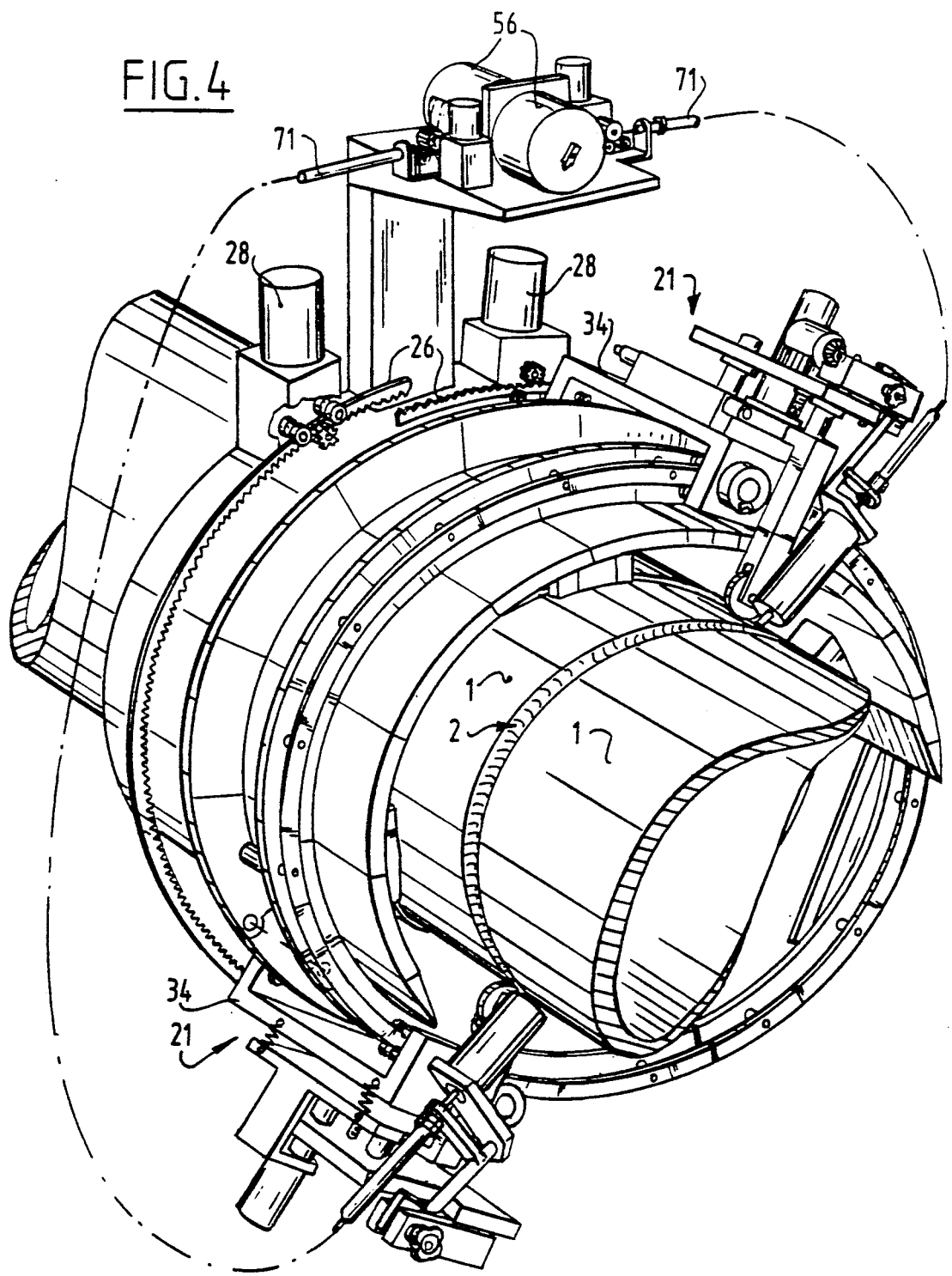

DEVICE FOR WELDING PIPES TO EACH OTHER

BACKGROUND OF THE INVENTION

1. Field of the Invention

The invention relates to a device for welding together pipe ends of pipes held mutually in line.

2. Description of the Related Art

Such a device is known. Therein a guide band is clamped around one of the pipes for welding, which also serves as guide frame for a welding carriage and which also comprises a gear rim of a carriage drive. The size of such a guide band is essential and thus cannot be arranged in advance around a pipe which still has to be transported over transport rollers. This guide band must therefore be arranged at the welding station. If this band were arranged beforehand, the welding carriage would have to be arranged on the guide band later, such that it grips around the guide rails, which is in itself cumbersome. The known guide band is not easy to adapt to varying pipe diameters.

SUMMARY OF THE INVENTION

The invention has for its object to provide an improved device. According to the invention the ring frame can carry one or more welding carriages while the ring frame is attached to the fixing band.

BRIEF DESCRIPTION OF THE DRAWINGS

Those and other features according to the invention will be elucidated in the description following hereinbelow with reference to the drawings, wherein:

FIGS. 1 and 4 each show a perspective view of two different devices according to the invention;

FIG. 2 shows on a larger scale a lengthwise section along the line II—II of FIG. 1; and FIG. 3 shows a view along arrows III of FIG. 2.

DETAILED DESCRIPTION OF THE PREFERRED EMBODIMENT

The present invention is particularly of use on a pipelayer in the form of a vessel, wherein a series of pipes are held mutually in line and are welded to each other to form a pipe string which sinks to the surface located under water. Welding work is herein carried out simultaneously at a number of welding stations.

FIG. 1 shows one welding station 6, where a ring weld 2 is applied between two pipes 1 held in mutual alignment. For this purpose one pipe 1 is supplied at a time to a welding station 6 which carries a fixing band 3 preferably placed therearound in advance. This is a thin, elastic, metal, annular band which is cut through on the bottom and provided with a band closure 4. The fixing band 3 can be clamped around a pipe 1 with considerable tension. During fitting of the fixing band care is taken that this has a predetermined distance q to the pipe end face 5.

At the location of the welding station 6, a support ring 7 and pipe alignment means 8 are arranged inside the pipes at the position of the ring weld and are supported on a core (not drawn) held in the pipes 1.

Also placed on the fixing band 3 at the position of the welding station 6 is a ring frame 9, which is manipulated to this end by hoisting means 10 which grip onto hooks 11 of ring frame 9. The ring frame 9 comprises an upper ring piece 12 which grips with support blocks 13 onto both edges of fixing band 3 in addition to two lower ring pieces 15 which are pivotally attached to the piece 12 on shafts 14 and which can be opened and closed by means of pneumatic cylinders 16. In the closed position, the lower ring pieces 15 can be firmly coupled to one another by means of closing means 17. The closed ring frame 9 has radial flanges 18 to which continuous rails 19 are fixed over the whole periphery by means of axial pins 20. A chassis 34 of a welding carriage 21 is guided over both rails 19 by means of guide rollers 22 which grip with V-shaped grooves 24 onto the wedge-shaped inner and outer edges 23 of rails 19.

Fixed to the chassis 34 of the welding carriage 21 is a gear rim 26. Fixedly attached to the ring frame 9 is an electric stepping motor 28 having a reduction drive gear 29 which drives the gear rim 26 and therewith the welding carriage 21 via a tooth wheel 30. The gear rim 26 is held between the tooth wheel 30 and two guide rollers 31. The mass of the welding carriage 21 is reduced because the motor 28 with the drive gear 29 is supported by the fixed ring frame 9. A support frame 33 is connected pivotally about a longitudinal axis 35 to the chassis 34 and is thus adjustable and is controlled subject to a senses the shape of 36 which picks up the pipe and consists of a support roller bearing on the outer periphery of pipe 1 and is connected to support frame 33 by means of a support 37. A lance carrying frame 38 is guided for adjustment in radial direction relative to the support frame 33 by means of pins 39 and is adjusted by means of an electric stepping motor 40 via a gear transmission 41 and a screw spindle 42.

A lance carrier 44 is connected to the lance carrying frame 38 for swivelling about a radial axis of pivot 45 and is driven in an oscillating manner by an electric stepping motor 46 via a bevel drive gear 47. As a result, the welding lance 48 carried by the lance carrier 44 covers the zigzag path 49 with curved zigzag lines 50 shown in FIG. 3. A better weld is hereby achieved. A slide frame is optionally built in between the lance carrying frame 38 and the lance carrier 44 in order to displace the swivel axis 45 in an axial direction of ring frame 9 in the case a pipe end face is cut at a slant.

The welding lance 48 is fixed to the lance carrier 44 by means of a lance holder 53 which can be swivelled into a cleaning position about a longitudinal axis 54 and which can be fixed into a selected, more or less oblique welding lance position by means of a hand control 55. Further, using means that are not drawn, the welding lance 48 is manually adjustable in a holding block 97 in order to orient the welding lance 48 into its starting position.

In order to reduce the mass of the welding carriage 21, a welding wire carrier 57 is fixed to the ring frame 9 and carries a supply roll 56 of welding wire 59 and an electric stepping motor 60 for driving the welding wire 59 by means of a drive roller 61. In the case of thin welding wires, three rollers (not drawn) are disposed such that they together straighten the welding wire 59.

The welding wire 59 is guided to the welding lance via an elastic, flexible conduit 71 arranged close-fittingly around the wire.

Also present are remote control means 64 for controlling the diverse mentioned motors.

An angle measuring device 66 is arranged on the welding carriage 21 for measuring the angular distance b between the welding point 67 of the welding lance 48 on the weld periphery and a reference point 68.

The angle measuring device 66 is preferably situated in the lengthwise plane through the welding point 67 drawn in FIG. 2.

The motors 28, 58, 40 and/or 46 and optionally also a gas control (not drawn) for feeding gas to the welding lance are automatically controlled subject to the measured momentary angular distance b by means of a computer 70.

This method for controlling the welding process has the advantage that welding takes place automatically in a continually changing manner which takes into account the slope of the weld at the position of the welding point 67. This saves the welder a great deal of work and concentration so that he has only a supervisory function. The welding speed can thereby be increased to the welding speed permissible for each welding point 67, in contrast to the known method wherein a speed permissible for all welding points 67 is set. The mentioned stepping motors can — although not in preference — consist of hydraulic or electromagnetic motors or electric DC or AC motors which are provided with a suitable control with a feedback signal.

The welding device 25 of FIG. 4 corresponds with those of FIGS. 1 and 2 with the difference that two welding carriages 21 are now present. Each welding carriage has connected to their chassis 34 a gear rim 26 which is each gripped by their own motor 28. There are of course two motors 58 likewise present for the welding wire feed.

It is noted that the ring frame 9 and the welding carriage(s) 21 belonging thereon can be used for all kinds of pipe diameters if an adapted fixing band 3 is employed with adapted support blocks 13 which are releasably attached to the upper ring piece 12.

The invention can be used for pipes of different steel types and with dimensions varying from 4 to 20" having a wall thickness from 6 to 30 mm.

I claim:

1. A device for welding together pipe ends of pipes held mutually in line, comprising the combination of at least one fixing band and a ring frame for opening and closing gripping engagement of the fixing band, wherein guide rail means extend along the periphery of the fixing band for guiding at least one welding carriage along the periphery of a ring weld, said ring frame comprising an upper ring piece and at least one lower ring piece pivotally connected thereto, wherein said lower ring piece has a motor means for urging said lower ring piece in its closed position, and wherein peripheral welding of said pipe ends by said welding carriage is performed in said closed position.

2. The device as claimed in claim 1, wherein the ring frame comprises an upper ring piece and two lower ring pieces pivotally connected thereto.

3. The device as claimed in claim 1, further comprising closing means for locking said lower ring piece in its closed position.

4. The device as claimed in claim 1, wherein said motor means comprises a hydraulic cylinder.

5. The device as claimed in claim 1, further comprising:
   a gear rim fixed to said welding carriage; and
   a motor attached to said ring frame;
   wherein said welding carriage is guided by said guide rail means; and
   said motor drives said gear rim through a tooth wheel thereby driving said welding carriage.

6. The device as claimed in claim 5, wherein the motor is an electric stepping motor.

7. The device as claimed in claim 1, wherein said welding carriage comprises:
   a chassis guided along said guide rail means; and
   a support frame adjustably connected to said chassis;
   wherein said support frame is controlled by a pick-up, said pick-up sensing the shape of the pipe and adjusting said support frame according to said shape.

8. The device as claimed in claim 7, further comprising at least one lance carrying frame, said lance carrying frame being radially adjustable relative to the support frame.

9. The device as claimed in claim 8, further comprising at least one lance holder pivotally connected to the lance carrying frame and being driven by a stepping motor via a bevel drive gear, wherein during welding, the welding lance performs a zigzag movement covering a curved zigzag path.

10. The device as claimed in claim 1, wherein at least two welding carriages are arranged on the ring frame.

11. The device as claimed in claim 1, wherein a motor for driving a welding wire feed is fixed to the ring frame.

12. The device as claimed in claim 1, wherein a control means for controlling the welding process is fixed to the ring frame.

13. A device for welding together pipe ends of pipes held mutually in line, comprising the combination of at least one fixing band and a ring frame for opening and closing gripping engagement of the fixing band, wherein guide rail means extend along the periphery of the fixing band for guiding at least one welding carriage along the periphery of a ring weld, said ring frame comprising an upper ring piece and two lower ring pieces each pivotally connected thereto, wherein each of said two lower ring pieces have a motor means for urging said lower ring pieces in their closed position, and wherein peripheral welding of said pipe ends by said welding carriage is performed in said closed position.

14. The device as claimed in claim 13, further comprising closing means for locking said lower ring pieces in their closed position.

15. The device as claimed in claim 13, wherein said motor means comprises a hydraulic cylinder.

* * * * *